United States Patent
Reber et al.

[19]

[11] Patent Number: 6,138,151
[45] Date of Patent: *Oct. 24, 2000

[54] NETWORK NAVIGATION METHOD FOR PRINTED ARTICLES BY USING EMBEDDED CODES FOR ARTICLE-ASSOCIATED LINKS

[75] Inventors: William L. Reber, Rolling Meadows, Ill.; Cary D. Perttunen, Shelby Township, Mich.; Jeffrey G. Toler, Algonquin, Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/938,266

[22] Filed: Sep. 26, 1997

[51] Int. Cl.[7] .......................... G06F 15/16; G06F 15/173
[52] U.S. Cl. ...................... 709/219; 709/217; 709/218; 709/223
[58] Field of Search ..................... 709/212, 216, 709/218, 245, 250, 227, 217, 219, 223; 348/100, 108; 707/513, 505; 359/17

[56] References Cited

U.S. PATENT DOCUMENTS

| | | | |
|---|---|---|---|
| 3,818,190 | 6/1974 | Silverman et al. | 235/382 |
| 3,999,042 | 12/1976 | Silverman et al. | 235/382 |
| 4,044,227 | 8/1977 | Holm et al. | 235/437 |
| 4,721,849 | 1/1988 | Davis et al. | 235/472 |
| 4,736,096 | 4/1988 | Ushikubo | 235/472 |
| 4,801,789 | 1/1989 | Davis | 235/472 |
| 4,803,643 | 2/1989 | Hickey | 707/513 |
| 4,841,132 | 6/1989 | Kijitani et al. | 235/472 |
| 4,916,441 | 4/1990 | Gombrich | 340/825.3 |
| 4,937,853 | 6/1990 | Brule et al. | 379/93.13 |
| 5,115,326 | 5/1992 | Burgess et al. | 358/440 |
| 5,156,898 | 10/1992 | McDonald | 428/100 |
| 5,280,625 | 1/1994 | Howarter et al. | 709/218 |
| 5,308,685 | 5/1994 | Froggatt | 428/204 |

(List continued on next page.)

FOREIGN PATENT DOCUMENTS

WO 97/01137  1/1997  WIPO .
WO 98/03923  1/1998  WIPO .
WO 98/20411  5/1998  WIPO .

OTHER PUBLICATIONS

"AC&E BarCode Information", url:www.intrepid.net/~scanlite/pagetwo.html.

Zuckerman, "It's a New Brand of E–Mail, Companies Want to Turn Computers Into Postage Meters", *The New York Times*, Monday, Apr. 28, 1997.

O'Malley, "Web TV", 10 PS 96, pp. 49–53.

Randall, "Discover the World Wide Web with Your Sportster", Samns.net.Publishing, 1996, (pp. 1–8).

"Advertising", *Community ConneXion, Inc.*, http://www.anonymizer.com/advert.html, 1995–1996, (p. 1).

"The Anonymizer FAQ", *Community ConneXion, Inc.*, http://www.anonymizer.com/faq.html, 1995–1996, (pp. 1–5).

*Primary Examiner*—Zarni Maung
*Assistant Examiner*—Jason D. Cardone
*Attorney, Agent, or Firm*—James E. Gauger

[57] ABSTRACT

A network navigation method includes steps of reading a first code (24) from an object (12), communicating a portion of the first code (24) to a first database (54), receiving translation information from the first database (54) to associate a plurality of electronic addresses with a plurality of codes (24, 26, 30) including the first code (24), and translating the first code (24) to a first electronic address using the translation information. A network navigation system is provided to perform the aforementioned steps.

26 Claims, 4 Drawing Sheets

U.S. PATENT DOCUMENTS

| | | | |
|---|---|---|---|
| 5,319,562 | 6/1994 | Whitehouse | 705/403 |
| 5,331,136 | 7/1994 | Koenck et al | 235/375 |
| 5,410,141 | 4/1995 | Koenck et al. | 235/472.02 |
| 5,416,310 | 5/1995 | Little | 235/462 |
| 5,468,952 | 11/1995 | Alexander et al. | 235/492 |
| 5,491,820 | 2/1996 | Belove et al. | 707/3 |
| 5,510,992 | 4/1996 | Kara | 705/408 |
| 5,539,870 | 7/1996 | Conrad et al. | 395/352 |
| 5,548,722 | 8/1996 | Jalalian et al. | 709/230 |
| 5,572,643 | 11/1996 | Judson | 709/218 |
| 5,583,940 | 12/1996 | Vidrascu et al. | 380/49 |
| 5,590,197 | 12/1996 | Chen et al. | 380/24 |
| 5,602,918 | 2/1997 | Chen et al. | 380/21 |
| 5,604,682 | 2/1997 | McLaughlin et al. | 709/219 |
| 5,606,507 | 2/1997 | Kara | 705/408 |
| 5,613,012 | 3/1997 | Hoffman et al. | 382/115 |
| 5,625,781 | 4/1997 | Cline et al. | 345/335 |
| 5,630,079 | 5/1997 | McLaughlin | 345/335 |
| 5,638,504 | 6/1997 | Scott et al. | 707/530 |
| 5,640,002 | 6/1997 | Ruppert et al. | 235/472 |
| 5,640,193 | 6/1997 | Wellner | 348/7 |
| 5,640,565 | 6/1997 | Dickinson | 395/683 |
| 5,659,164 | 8/1997 | Schmid et al. | 235/375 |
| 5,668,990 | 9/1997 | Bajorinas et al. | 707/104 |
| 5,677,955 | 10/1997 | Doggett et al. | 380/24 |
| 5,689,642 | 11/1997 | Harkins et al. | 709/207 |
| 5,694,471 | 12/1997 | Chen et al. | 380/25 |
| 5,694,546 | 12/1997 | Reisman | 705/26 |
| 5,717,860 | 2/1998 | Graber et al. | 709/237 |
| 5,724,595 | 3/1998 | Genter | 707/501 |
| 5,734,371 | 3/1998 | Kaplan | 345/158 |
| 5,745,389 | 4/1998 | Russell | 705/408 |
| 5,752,022 | 5/1998 | Chiu et al. | 707/10 |
| 5,758,216 | 5/1998 | Arnold | 396/311 |
| 5,774,670 | 6/1998 | Montulli | 709/227 |
| 5,804,803 | 9/1998 | Cragun et al. | 707/513 |
| 5,815,830 | 9/1998 | Anthony | 707/513 |
| 5,834,749 | 11/1998 | Durbin | 235/454 |
| 5,851,186 | 12/1998 | Wood et al. | 600/437 |
| 5,869,819 | 2/1999 | Knowles et al. | 235/375 |
| 5,905,248 | 5/1999 | Russell et al. | 235/462.27 |
| 5,905,251 | 5/1999 | Knowles | 235/472.01 |

NETWORK NAVIGATION METHOD FOR PRINTED ARTICLES BY USING EMBEDDED CODES FOR ARTICLE-ASSOCIATED LINKS

RELATED APPLICATIONS

The present invention is related to the following applications which are assigned to the same assignee as the present application:

"Electronic Network Navigation Device and Method for Linking to an Electronic Address Therewith", having Ser. No. 08/710,820, filed Sep. 23, 1996;

"Methods and Systems for Providing a Resource in an Electronic Network", having Ser. No. 08/726,004, filed Oct. 4, 1996;

"An Apparatus for Reading an Electronic Network Navigation Device and a Peripheral for Use Therewith", having Ser. No. 08/732,956, filed Oct. 17, 1996;

"Method, System, and Article of Manufacture for Producing a Network Navigation Device", having Ser. No. 08/744,338, filed Nov. 7, 1996; and "Transaction Methods, Systems, and Devices", having Ser. No. 08/858,184 filed May 28, 1997, now U.S. Pat. No. 5,930,767; and "Network Navigation Methods and Systems using an Article of Mail", having Ser. No. 08/876,934, filed Jun. 16, 1997.

The subject matter of the above-identified related applications is hereby incorporated by reference into the disclosure of this application.

The present application is also related to the following applications:

"Method, System, and Article of Manufacture for Navigating to a Resource in an Electronic Network", having Ser. No. 08/890,138, filed Jul. 10, 1997, now U.S. Pat. No. 5,902,353; and "Method, System, and Article of Manufacture for Navigating to a Resource in an Electronic Network", having Ser. No. 08/890,140, filed Jul. 10, 1997, now U.S. Pat. No. 5,903,729.

FIELD OF THE INVENTION

The present invention relates to methods and systems for navigating an electronic network.

BACKGROUND OF THE INVENTION

Many printed publications, including newspapers and magazines, have an associated Web site on the Internet. Examples of newspapers having an associated Web site include the Wall Street Journal (http://wsj.com), USA Today (http://www.usatoday.com), the New York Times (http://www.nytimes.com), and the Washington Post (http://www.washingtonpost.com). An example of a magazine having an associated Web site is Sports Illustrated (http://www.sportsillustrated.com).

The Wall Street Journal, for example, has an associated Interactive Edition which provides news updates, a technology section, and a searchable archive of personal technology articles. The Interactive Edition further provides associated information for a subset of the articles in the newspaper. These articles are identified by a "Journal Link" message such as "for more information about the article and an on-line discussion, see The Wall Street Journal Interactive Edition at http.//wsj.com".

A user who desires associated information for an article first either types "http://wsj.com" or otherwise links to the Wall Street Journal Interactive Edition.

SUMMARY OF THE INVENTION

The present invention provides a method of navigating an electronic network. The method comprises providing a printed publication having a first printed article, a second printed article, a first code associated with the first printed article, and a second code associated with the second printed article. The method further comprises reading the first code from the printed publication, accessing a remote database by communicating a portion of the first code to the remote database, and receiving translation information from the remote database. The translation information associates a first electronic address with the first code and a second electronic address with the second code, wherein the first electrode address differs from the second electronic address. The method further comprises translating the first code to the first electronic address using the translation information; storing, in a local database, the translation information received from the remoted database; reading the second code from the printed publication; and without accessing the remote database after reading the second code, translating the second code to the second electronic address using the translation information in the local database. The present invention further provides a system to perform the above method.

The present invention further provides a method of providing electronic address translation information. The method comprises receiving a portion of a code read from a printed publication having a plurality of printed articles and a plurality of codes for links associated with the printed articles. The method further comprises retrieving translation information for the plurality of codes based upon the portion of the code. The translation information associates a plurality of electronic addresses with the plurality of codes. The method further comprises communicating the translation information for the plurality of codes. The present invention further provides a system to perform the above method.

The present invention further provides a method of making a publication. The method comprises communicating, from a publisher to a remote computer, a first electronic address associated with a first article and a second electronic address associated with a second article. The method further comprises receiving, by the publisher and from the remote computer, a first code translatable to the first electronic address and a second code translatable to the second electronic address using translation information stored by a remote database accessible by a reader of the publication. The first code and the second code are unpredictable by the publisher prior to said communicating. The method further comprises printing the first article, the first code, the second article, and the second code to the publication. The present invention further provides a system to perform the above method. Thereafter, the user must navigate within the Web page to locate either the associated information or a link thereto.

BRIEF DESCRIPTION OF THE DRAWINGS

The invention is pointed out with particularly in the appended claims. However, other features of the invention are disclosed in the following detailed description and the accompanying drawings in which:

DETAILED DESCRIPTION OF PREFERRED EMBODIMENTS

Embodiments of the present invention advantageously provide methods, systems, and articles for automatically navigating an electronic network to a destination associated with an article in a printed publication. An end user can navigate to the destination using the printed publication without necessarily knowing the electronic address for the destination. As a result, the electronic address and the format for the electronic address become more transparent to the end user.

Figure 1:
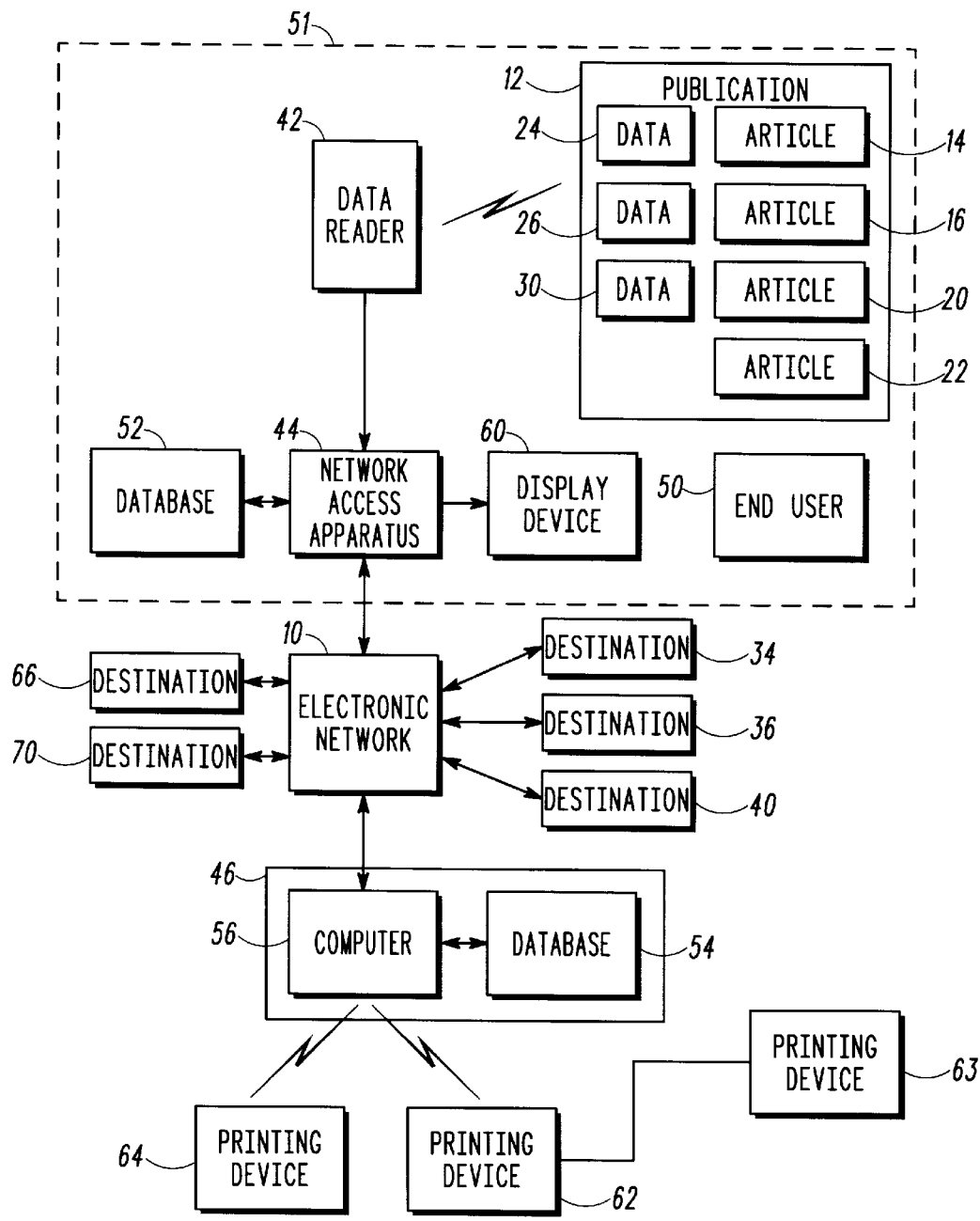
FIG. 1 is a block diagram of an embodiment of a system for navigating an electronic network using a printed publication.

FIG. 1 is a block diagram of an embodiment of a system for navigating an electronic network 10 using a printed publication 12. Preferably, the electronic network 10 includes an open, wide area network such as the Internet, the World Wide Web, or an online service. Other examples of the electronic network 10 include but are not limited to: an intranet, an extranet, a local area network, a telephone network such as a public switched telephone network, a cellular telephone network, a personal communication system (PCS) network, a television network such as a cable television system, a paging network such as a local paging network, a regional paging network, a national paging network, or a global paging network, and a wireless data network such as a satellite data network or a local wireless data network.

Examples of the printed publication 12 include, but are not limited to, a newspaper, a magazine, a journal, or another periodical, a book, and a directory. The printed publication 12 has a plurality of articles including a first article 14, a second article 16, a third article 20, and a fourth article 22. Two or more of the articles can be printed onto the same page of the printed publication 12. Alternatively, a single page may have only one of the articles.

In this disclosure, the term "article" should be construed as including of written stores, editorials, images, graphs, and classified and other advertisements, in the printed publication 12.

Associated with at least a subset of the articles is a plurality of printed codes. The printed codes include a first printed code 24 associated with the first article 14, a second printed code 26 associated with the second article 16, and a third printed code 30 associated with the third article 20. For purposes of illustration and example, the fourth article 22 is absent of an associated printed code.

Preferably, each of the printed codes includes a bar code such as a one-dimensional or a two-dimensional bar code to identify its associated article. Examples of one-dimensional bar codes include, but are not limited to, 3 of 9, UPC-A, UPC-E, code 128, Codabar, MSI, Extended 3 of 9, Code 93, Extended Code 93, Industrial 2 of 5, Standard 2 of 5, Code 11, UCC, and EAN/JAN. Examples of two-dimensional bar codes include, but are not limited to, Data Matrix and PDF417.

Each of the printed codes is used to navigate to a respective one of a plurality of destination of the electronic network 10. The first printed code 24 is used either to select or to navigate to a first destination 34. The second printed code 26 is used either to select or to navigate to a second destination 36. The third printed code 30 is used either to select or to navigate to a third destination 40.

Preferably, each printed code uniquely identifies its destination using a code that does not directly encode an electronic address. For example, each printed code can include a bar code representation of a sequence of alpha and/or numeric characters which differ from its associated electronic address. In this way, each printed code can conceal its associated electronic address from the end user 50.

A data reader 42 is used to read one of the printed codes from the printed publication 12. The data reader 42 preferably includes an optical data reader such as a bar code reader, a scanning wand, a handheld scanner, a page scanner, a business card reader, a photograph reader, a fax machine, or generally, a linear CCD (charge coupled device) reader or a two-dimensional CCD reader.

The data reader 42 communicates a signal representative of the printed code to a network access apparatus 44. In response to receiving the printed code, the network access apparatus 44 may optionally execute any combination of: a predetermined client routine (e.g. a predetermined Internet browser routine or an electronic mail composition routine), a predetermined network provider access routine (e.g. to dial and log on to a predetermined service provider), and navigation instructions for automatically linking the network access apparatus 44 to a node 46 via the electronic network 10.

It is noted that the network access apparatus 44 can have a variety of forms, including but not limited to, a general purpose computer, a network computer, a network television, an Internet television, an Internet telephone, a portable wireless device, a television receiver, a game player, a video recorder, and an audio component. Regardless of its form, the network access apparatus 44 typically includes a processor in communication with at least one input device, a memory, and at least one storage device. The processor can include a microprocessor, an application-specific integrated circuit, or another suitable integrated circuit. The memory can include a read-only memory and/or a random access memory in communication with the processor. The at least one input device can include a keyboard and/or a pointing device for receiving user-initiated events from an end user 50 at a user location 51. Optionally, the at least one input device receives a code from the publication 12 from a manual input by the end user 50. The at least one storage device can include a floppy disk drive, a PC card storage device, an optical drive, a DVD drive, a CD-ROM drive, or a hard drive to store computer-readable data.

To communicate with the electronic network 10, the network access apparatus 44 includes a modem, a network adapter, a wireless transceiver, a wireline transceiver, or another transceiver. The network access apparatus 44 can communicate with the electronic network 10 via a line such as a telephone line, an ISDN line, a coaxial line, a cable television line, a fiber optic line, a computer network line, or the like. Alternatively, the network access apparatus 44 can wirelessly communicate with the electronic network 10.

Based upon the printed code, an electronic address for the destination is determined using either a local database 52 (i.e. local to the network access apparatus 44) or a remote database 54 accessible via the node 46. The local database 52 and the remote database 54 each includes a storage device to read and to store data in a computer-readable form to a computer-readable storage medium. Examples of the computer-readable storage medium include, but are not limited to, an optical storage medium such as a compact disk read-only memory (CD-ROM) or a digital versatile disk (DVD), a magnetic storage medium such as a hard disk or a floppy disk, and an electronic storage medium such as a memory. Regardless of the storage medium, the local database 52 and the remote database 54 each includes a plurality of records associating printed codes with electronic addresses.

The network access apparatus 44 communicates a portion of the printed code to a computer 56 via the electronic network 10. Preferably, the portion of the printed code is shorter than an entire portion of the printed code. It is also preferred that the portion of the printed code be equivalent for each of the printed codes 24, 26, and 30 associated with the printed publication 12.

The computer 56 receives the portion of the printed code, matches the portion to one or more records in the database 54, and returns a plurality of electronic addresses associated with the publication. Regardless of which of the printed codes 24, 26, and 30 is read, the returned electronic addresses include addresses for the first destination 34, the second destination 36, and the third destination 40.

Each electronic address can identify its destination using at least a portion of a URL (Uniform Resource Locator), a URN (Uniform Resource Name), an IP (Internet Protocol) address, or an electronic mail address. It is noted that a URL can include up to four parts: a protocol, a domain name, a path, and a filename. URL protocols include: "file:" for accessing a file stored on a local storage medium; "ftp:" for accessing a file from an FTP (file transfer protocol) server; "http:" for accessing an HTML (hypertext marking language) document; "gopher:" for accessing a Gopher server; "mailto:" for sending an e-mail message; "news:" for linking to a Usenet newsgroup; "telnet": for opening a telnet session; and "wais:" for accessing a WAIS server. Consequently, the printed publication 12 can be utilized for automatically initiating any of the above tasks.

Typically, the node 46 and the electronic addresses for the destinations 34, 36, and 40 have different URLs. For example, the node 46 can have a different domain name than the electronic address.

Translation information which associates the printed codes 24, 26, and 30 with the electronic addresses for the destinations 34, 36, and 40, respectively, is communicated from the computer 56 to the network access apparatus 44 via the electronic network 10. The network access apparatus 44 stores the translation information in the database 52. Using the translation information, the network access apparatus 44 translates the full printed code to an electronic address. Thereafter, the network access apparatus 44 can perform any combination of: linking to the electronic address, communicating data to the electronic address, and receiving data from the electronic address.

By linking to the electronic address, the end user 50 can link to a Web page or an online document associated with the article. By communicating data to the electronic address, the end user 50 can send an electronic mail message, respond to a poll, electronically vote in an election, or initiate a transaction. By receiving data from the electronic address, the end user 50 can receive a reprint of the article, spreadsheet data for a graph, or other information associated with the article. Optionally, the data can be received using push technology or a network broadcast. Typically, the data is absent of information about the printed publication 12 itself.

A display device 60, such as a monitor, a television, or a liquid crystal display, is either coupled to or included with the network access apparatus 44 to display visual information received from the electronic address. In general, the visual information can include textual information and/or graphical information.

Once the translation information for the printed publication 12 is stored in the local database 52, other ones of the printed codes 24, 26, and 30 can be translated without having to access the remote database 54.

The translation information in the remote database 54 is created in response to data received from a publisher terminal 62. The publisher terminal 62 is associated with a publisher of the printed publication 12. The publisher terminal 62 includes a computer or a like network access apparatus to communicate with the node 46.

Specifically, the publisher terminal 62 communicates electronic addresses for the destinations 34, 36, and 40 to the node 46. The computer 56 generates a plurality of codes, one for each electronic address. For example, the computer 56 generates the first printed code 24 associated with the first destination 34, the second printed code 26 associated with the second destination 36, and the third printed code 30 associated with the third destination 40. The computer 56 stores in the database 54 translation information associating the codes with the electronic addresses. Additionally, the codes are communicated from the node 46 to the publisher terminal 62. The publisher prints the publication 12 associating the codes 24, 26, and 30 with the articles 14, 16, and 20 using a printing device 63.

It is noted that the node 46 can provide translation information for a plurality of printed publications. For example, translation information for a second publication can be created in response to receiving electronic addresses from a publisher terminal 64. The electronic addresses can identify destinations 66 and 70 of the electronic network 10, for example.

It is also noted that the node 46 can perform any of the functions of the nodes described in the reference entitled "Methods and Systems for Providing a Resource in an Electronic Network" incorporated by reference into this disclosure. Examples of these functions include, but are not limited to, monitoring a usage parameter for electronic network navigation using the printed codes, limiting electronic network navigation when the usage parameter attains a usage limit, and providing a proxy server for the destinations of the electronic network 10. Additionally, the node 46 can specify a level of service with which to provide a resource to the end user 50.

Preferably, the node 46 is dedicated to providing translation information using either textual data or computer-readable data. In this case, the node 46 does not provide multimedia services.

Further, it is noted that as an alternative to the herein-described examples of electronic addresses, the printed publication 12 can be used to navigate to a telephone number (either wireless or wireline), a fax number, a pager number, or a personal communication system (PCS) number. In these cases, the databases 52 and 54 can store records which associate a telecommunication code with the printed code. By reading the printed code using the data reader 42, the end user 50 can automatically initiate a telephone call, a fax, a paging message, or a PCS call to an individual associated with the article (e.g. an author of the article, an advertiser, or another individual).

Figure 2:
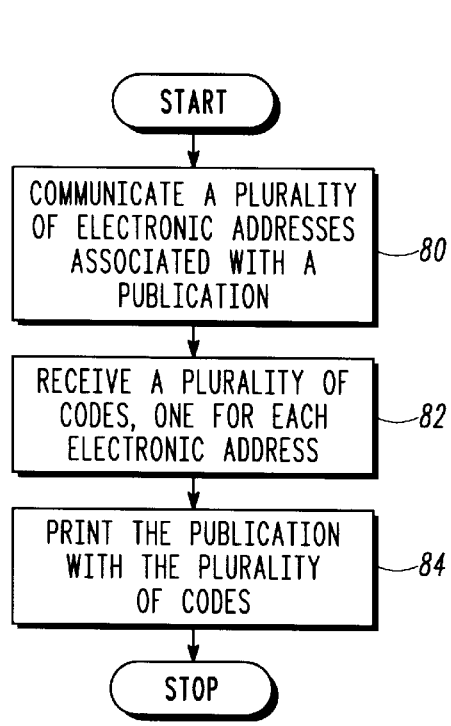
FIG. 2 is a flow chart of an embodiment of a method of making the printed publication.

FIG. 2 is a flow chart of an embodiment of a method of making the printed publication 12. As indicated by block 80, the method includes a step of communicating a plurality of electronic addresses associated with the printed publication 12. The electronic addresses are communicated from the publisher terminal 62 to the computer 56 associated with the node 46. Preferably, the electronic addresses are communicated in a first electronic mail message to the node 46.

As indicated by block 82, the method includes a step of receiving a plurality of codes from the node 46. The plurality of codes includes a respective code for each of the plurality of electronic addresses. Preferably, the codes are received in a second electronic mail message from the node 46 to the publisher terminal 62.

As indicated by block 84, a step of printing the publication 12 using the codes is performed. Preferably, the codes are extracted from the second electronic mail message received by the publisher terminal 62. Typically, each of the codes is printed adjacent to its associated article. Alternatively, the codes can be printed in the form of an index which may or may not be adjacent to the articles.

Figure 3:
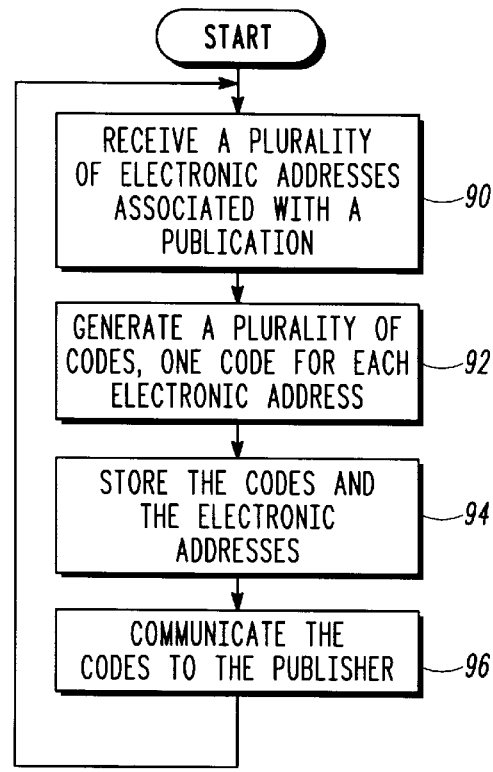
FIG. 3 is a flow chart of an embodiment of a method of creating the translation information in the remote database.

FIG. 3 is a flow chart of an embodiment of a method of creating the translation information in the remote database 54. As indicated by block 90, the method includes a step of receiving a plurality of electronic addresses associated with the publication 12. The electronic addresses identify and locate the destination 34, 36, and 40, for example. Preferably, the node 46 receives the electronic addresses within an electronic mail message communicated from the publisher terminal 62.

As indicated by block 92, a step of generating a plurality of codes is performed. Each of the codes corresponds to a respective one of the electronic addresses. Preferably, the codes are generated by the computer 56. It is noted that the codes can be generated either prior to or subsequent to receiving the electronic addresses in block 90.

Preferably, each of the codes has an article-specific portion and a publication-specific portion. The article-specific portion differs for different articles within the publication 12. The publication-specific portion is the same for each of the codes in the publication 12, but differs for other publications. If desired, the publication-specific portion can remain the same for two or more editions of the printed publication. Alternatively, the publication-specific portion can differ for different editions of the printed publication. In this way, it is preferred that the printed codes 24, 26, and 30 have the same publication-specific portion, but differing article-specific portions.

As alternatives to or in addition to the publication-specific portion, each code can include a page-specific portion indicative of a page of the publication 12, and/or a section-specific portion indicative of a section of the publication 12 (e.g. a front section, a sports section, a business/money section, a life section, an arts section, or a marketplace section).

The article-specific codes can be generated randomly or psuedorandomly to be unpredictable by the end user 50 and the publisher. Alternatively, the article-specific codes can be generated by incrementing or decrementing a code from article to article.

As indicated by block 94, a step of storing the codes and the electronic addresses in the remote database 54 is performed. The codes and the electronic addresses are associated with one another in the remote database 54 to form translation information.

As indicated by block 96, a step of communicating the codes to the publisher terminal 62 is performed. Thereafter, the codes are used by the publisher to make the printed publication.

Figure 4:
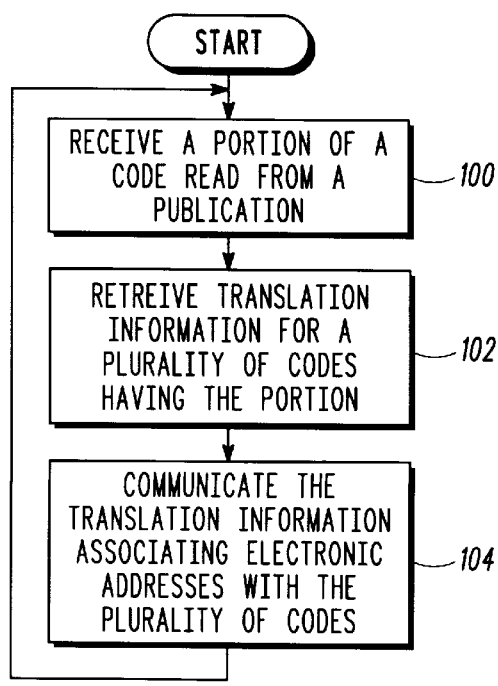
FIG. 4 is a flow chart of an embodiment of a method of providing translation information.

FIG. 4 is a flow chart of an embodiment of a method of providing translation information. As indicated by block 100, the method includes a step of receiving a portion of a code read from the printed publication 12. The portion of the code is received by the computer 56 via the electronic network 10. In exemplary embodiments, the portion of the code consists of the publication-specific portion of the code. In general, it is preferred that the portion of the code be less than the entire code.

As indicated by block 102, a step of retrieving translation information for a plurality of codes having the portion is performed. The computer 56 retrieves the translation information from the database 54. Preferably, the computer 56 retrieves translation information for all codes in the database 54 having the publication-specific portion. For example, for the publication-specific portion common to the printed codes 24, 26, and 30, the computer 56 retrieves electronic addresses for the destinations 34, 36, and 40.

As indicated by block 104, a step of communicating the translation information associating electronic addresses with the plurality of codes is performed. The computer 56 communicates the translation information to the network access apparatus 44 using the electronic network 10. If desired, the communicated translation information can be compressed.

Figure 5:
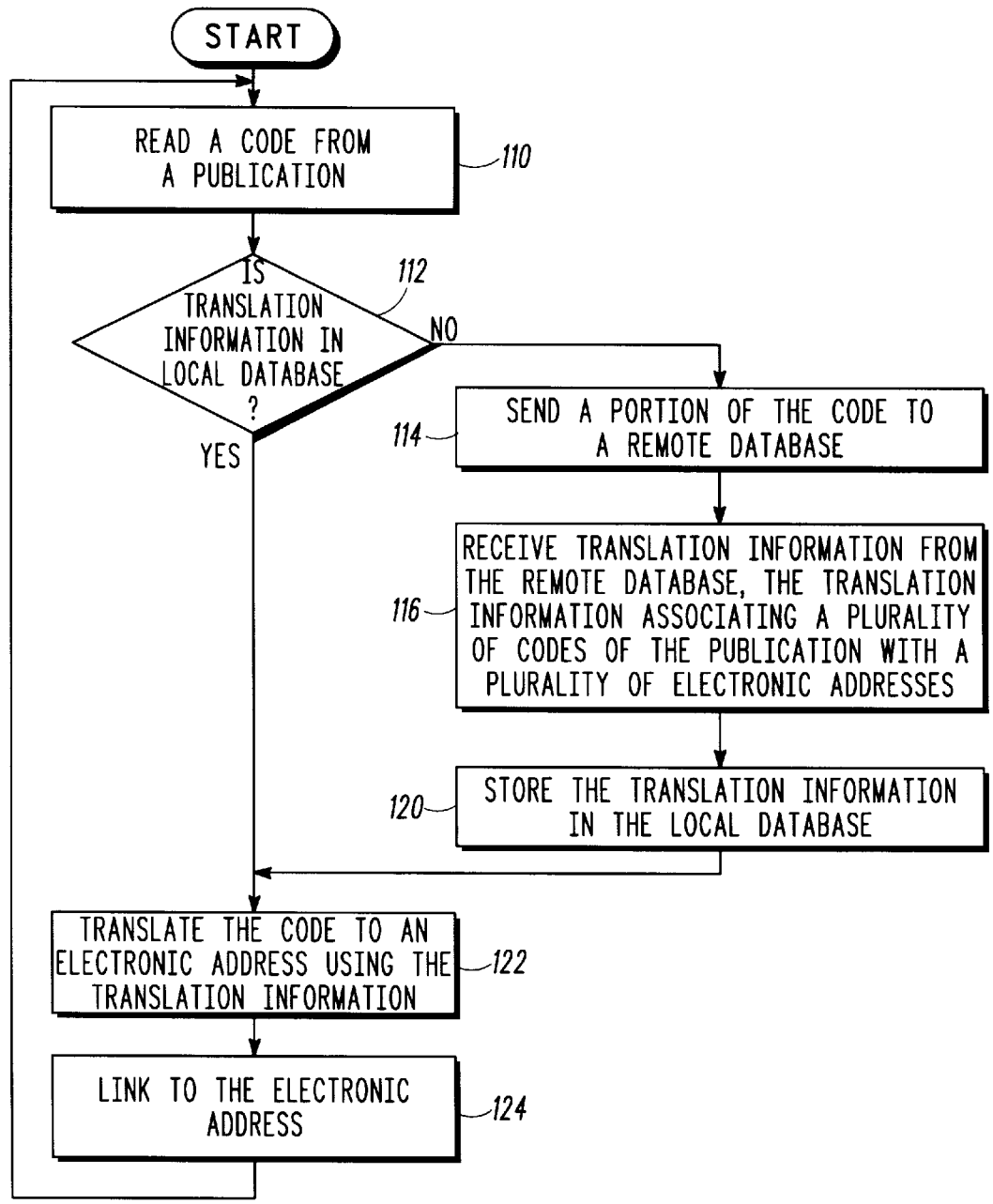
FIG. 5 is a flow chart of an embodiment of a method of navigating the electronic network using the printed publication.

FIG. 5 is a flow chart of an embodiment of a method of navigating the electronic network 10 using the printed publication 12. As indicated by block 110, the method includes a step of reading a printed code from the printed publication 12. The printed code is read using the data reader 42. Optionally, the printed code is decoded into an article-specific portion and one or more of a publication-specific portion, a section-specific portion, and a page-specific portion in accordance with a predetermined bar code standard.

As indicated by block 112, the method includes a step of determining if translation information for the printed code is present in the local database 52. If the translation information for the printed code is not present, a step of sending a portion of the printed code to the remote database 54 is performed as indicated by block 114. The portion of the code is communicated from the network access apparatus 44 to the node 46 via the electronic network 10. The portion of the code can be communicated in an electronic mail message or can be communicated to a Web page provided by the node 46.

Preferably, the network access apparatus 44 communicates at least one of the publication-specific portion, the section-specific portion, and the page-specific portion, but withholds the article-specific portion from the node 46. Alternatively, the network access apparatus 44 can communicate the article-specific portion along with other portions of the code.

Thereafter, a step of receiving translation information from the remote database 54 is performed as indicated by block 116. The translation information is received by the network access apparatus 44 via the electronic network 10. The translation information can be received in a subsequent electronic mail message, or can be received in a downloadable file from the aforementioned Web page. If compressed, the translation information can be decompressed at this point.

The translation information associates a plurality of codes of the publication 12 with a plurality of electronic addresses. For example, the translation information can associate the printed codes 24, 26, and 30 with electronic addresses for the destinations 34, 36, and 40.

As indicated by block 120, a step of storing the translation information is performed. The network access apparatus 44 stores the translation information in the local database 52.

As indicated by block 122, the code read in block 110 is translated to an electronic address using the translation information in the local database 52. For example, the printed code 24 translates to an electronic address for the destination 34, the printed code 26 translate to an electronic address for the destination 36, and the printed code 30 translates to an electronic address for the destination 40.

Optionally, a step of linking to the electronic address is performed as indicated by block 124. In this step, the network access apparatus 44 transmits data representative of the electronic address to establish a link to the destination the electronic network 10.

Upon linking to the destination, data can be communicated between the network access apparatus 44 and the destination. The data can encode audible information and/or visual information, such as graphical information and/or textual information, from the electronic address. Examples of data content include, but are not limited to, any combination of a file from a local hard drive, a file from a FTP server, an HTML document, content from a Gopher server, a message from a newsgroup, a transmission from a Telnet session, a transmission from a WAIS server, an animation file, a movie file, an audio file, downloadable software, and an electronic book file, or an audio/video teleconference.

Flow of the routine returns to block 110, wherein another code is read. Advantageously, once the translation information for the printed publication 12 is stored in the local database 52, other ones of the printed codes 24, 26, and 30 can be translated without having to access the remote database 54.

Articles of manufacture can be formed to direct the publisher terminal 62, the computer 56, and the network access apparatus 44 to perform the herein-described methods. The article of manufacture can include a computer-readable storage medium having computer-readable data stored therein which directs the network access apparatus 44 to perform the above-described steps. Examples of the computer-readable storage medium include, but are not limited to, a logic circuit, a memory, a mass storage medium, an optical disk, a CD-ROM, a magnetic disk, a floppy disk, a hard disk, and a PCMCIA card.

Figure 6:
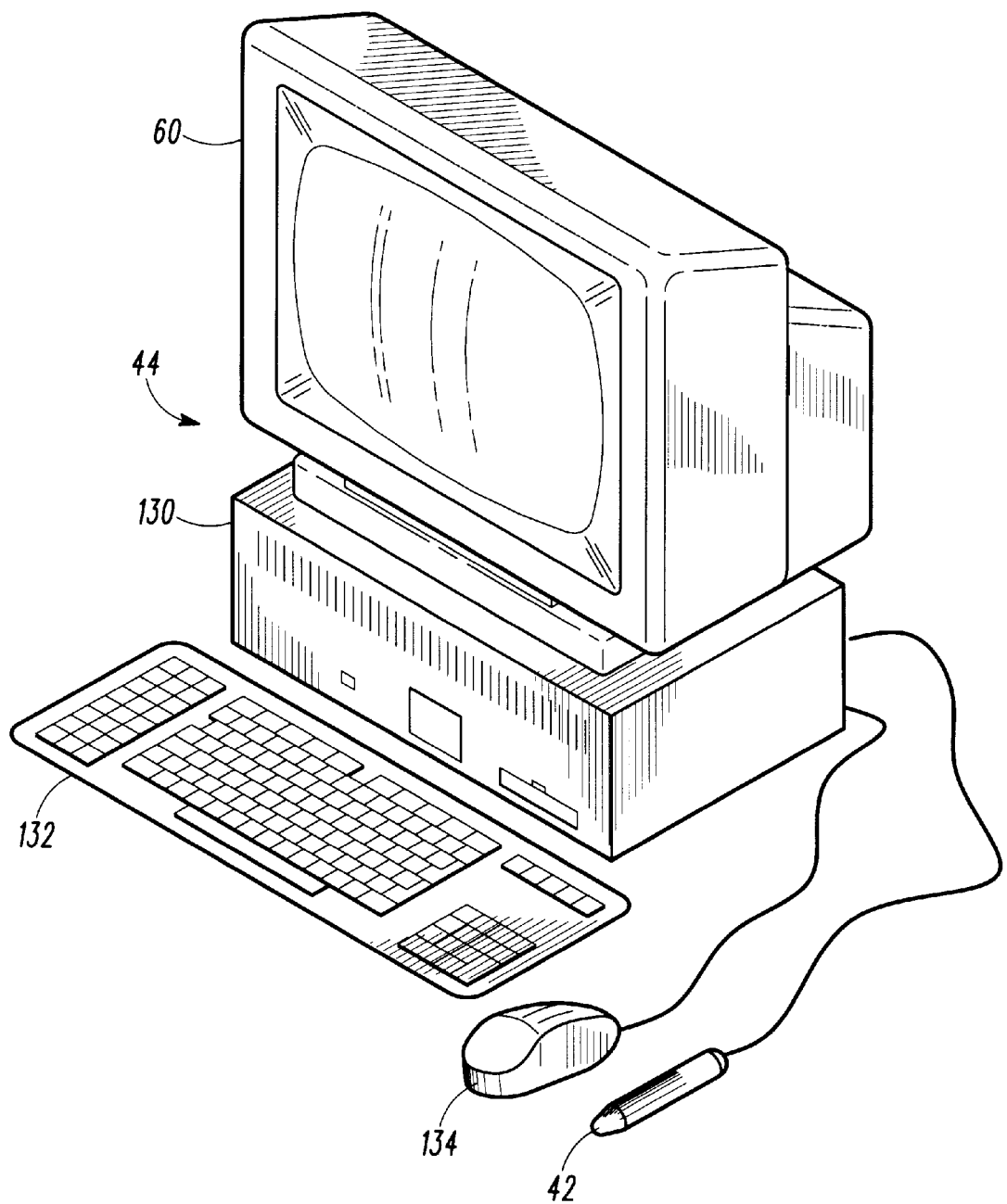
FIG. 6 is an illustration of an example of the data reader and the network access apparatus at the user location.

FIG. 6 is an illustration of an example of the data reader 42 and the network access apparatus 44 at the user location 51. In this example, the network access apparatus 44 comprises a personal computer 130, and at least one input device including a keyboard 132 and a mouse 134. The display device 60 comprises a monitor connected to a video port of the personal computer 130. The data reader 42 includes a bar code reader connected to a serial port of the personal computer 130. The personal computer 130 includes a modem, a network adapter, a satellite dish transceiver, or another transceiver for communicating with the electronic network 10.

It is noted that the publication 12 can support magnetic data, electronic data, or optical data to identify the articles as alternatives to printed codes. If desired, the codes can be readable in more than one mode. For example, printed data can be printed with a magnetic substance, such as magnetic ink, so as to be both optically readable and magnetically readable.

It should be appreciated that the publication 12 can generally include any plurality of printed codes, and should not be construed to be limited to having three printed codes as illustrated.

Further, although preferred embodiments of the present invention are described for use with a printed publication, it is noted that the scope of the present invention broadly includes other objects substituted for the printed publication. In this case, embodiments of the present invention can be used to receive information which may or may not be about the object itself.

Additionally, it is noted that the translation information received in response to reading a code on an object can include translation information for codes on other objects. For example, in response to receiving a single code read from a first publication, translation information may be received for other codes in the first publication and for codes in a second publication.

As an alternative to using codes which conceal electronic addresses, each code can directly encode a portion of, or an entire portion of, its associated electronic address (such as a URL or a URN). For example, each code can include a bar code to encode a URL or a URN in accordance with a predetermined bar code standard. In this case, the translation information can include a plurality of IP addresses corresponding to a plurality of URLs, URNs, or other electronic addresses associated with one ore more objects.

As an alternative to receiving data from a destination after reading a code from the publication, it is noted that the data can be received from the destination prior to reading the code. In this case, the network access apparatus 44 receives data from the destinations 34, 36, and 40 (e.g. content and/or translation information), and/or from the node 46 (e.g. translation information and/or content) without communicating any codes read from the printed publication 12 via the electronic network 10. Preferably, the entire on-line content for the printed publication 12 is received in this step. The on-line content can be received using an automatic download sequence, using path technology or another network broadcast technology, or within an electronic mail message. The on-line content is stored either to the database 52 or to a storage medium (such as a hard disk) of the network access apparatus 44. Preferably, the on-line content includes a plurality of files, one file for each of the printed codes 24, 26, and 30. Alternatively, the on-line content can be contained in a single file.

The on-line content is locally addressable using the printed codes 24, 26, and 30. Each printed code may either directly or indirectly encode some or all of a URL or a URN for a local file. For example, a printed code can directly encode at least a portion of a URL, such as "file:///c:/wsj/97072001.html" for example, for a file having information associated with an article. Alternatively, a printed code can be translated to the aforementioned URL using translation information received by the network access apparatus 44 and stored in the database 52. As another alternative, the information can be content addressable based upon the printed code.

Upon reading the printed code, data for a corresponding one of the articles is locally retrieved. For example, upon reading the printed code, data from the file having a filename of "97072001.html" can be retrieved from the "wsj" directory in the "c:" disk. This file is located in either the database 52 or the network access apparatus 44. Upon retrieving the file, data contained therein is displayed by the display device 60. In this way, the network access apparatus 44 retrieves and displays information associated with an article without sending an associated request command to the electronic network 10 upon reading a printed code.

Thus, there has been described herein several embodiments including preferred embodiments of network navigation methods, systems, and articles using a printed publication.

Because the various embodiments of the present invention communicate translation information for a plurality of codes in response to receiving a single code read from an publication, they provide a significant improvement in that other printed codes can be translated locally without having to access a remote database.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of navigating an electronic network, the method comprising the steps of:

providing a printed publication having a first printed article, a second printed article, a first code associated with the first printed article, and a second code associated with the second printed article;

reading the first code from the printed publication;

accessing a remote database by communicating a portion of the first code to the remote database and receiving translation information from the remote database, the translation information associating a first electronic address with the first code and a second electronic address with the second code, wherein the first electronic address differs from the second electronic address;

translating the first code to the first electronic address using the translation information;

storing, in a local database, the translation information received from the remote database;

reading the second code from the printed publication; and without accessing the remote database after reading the second code, translating the second code to the second electronic address using the translation information in the local database.

2. The method of claim 1 wherein the first code includes a publication-specific portion and a first article-specific portion, and wherein the second code includes the publication-specific portion and a second article-specific portion, wherein the first article-specific portion differs from the second article-specific portion.

3. The method of claim 2 wherein the portion of the first code is absent of the first article-specific portion.

4. The method of claim 1 further comprising the step of:

prior to translating the second code, determining that the translation information for the second code is present in the local database.

5. The method of claim 4 further comprising the step of:

prior to communicating the portion of the first code to the remote database, determining that the local database is absent of the translation information for the first code.

6. The method of claim 1 wherein the portion of the first code is communicated to the remote database via the electronic network, and wherein the translation information is received via the electronic network.

7. The method of claim 6 further comprising the step of linking to the first electronic address via the electronic network upon translating the first code to the first electronic address.

8. The method of claim 1 wherein the first code includes a publication-specific portion and a first article-specific portion, wherein the second code includes the publication-specific portion and a second article-specific portion, wherein the portion of the first code communicated to the remote database is absent of the first article-specific portion, the method further comprising the steps of:

prior to communicating the portion of the first code to the remote database, determining that the local database is absent of the translation information for the first code; and after reading the second code, determining that the translation information for the second code is present in the local database.

9. The method of claim 1 wherein the printed publication includes at least one of a newspaper, a magazine, and a journal.

10. The method of claim 1 wherein the first code and the second code include the portion of the first code.

11. The method of claim 1 wherein the first code is not human-readable.

12. The method of claim 1 wherein the electronic network includes at least one of an Internet, an intranet, and an extranet.

13. The method of claim 1 wherein the first electronic address includes at least a portion of at least one of a Uniform Resource Locator, a Uniform Resource Name, an Internet Protocol Address, and an electronic mail address.

14. The method of claim 1 wherein the first code indirectly encodes the first electronic address.

15. The method of claim 1 wherein the first code comprises a first bar code and wherein the second code comprises a second bar code.

16. A method of providing electronic address translation information, the method comprising the steps of:

receiving a portion of a code read from a printed publication having a plurality of printed articles and a plurality of codes for links associated with the printed articles;

retrieving translation information for the plurality of codes based upon the portion of the code, the translation information associating a plurality of electronic addresses with the plurality of codes; and communicating the translation information for the plurality of codes.

17. The method of claim 16 further comprising the steps, prior to receiving the portion of the code, of:

receiving the plurality of electronic addresses;

generating the plurality of codes; and storing the translation information associating the plurality of codes with the plurality of electronic addresses.

18. The method of claim 17 wherein the plurality of electronic addresses are received from a publisher of the printed publication, the method further comprising the step of communicating the plurality of codes to the publisher.

19. The method of claim 17 wherein the plurality of codes indirectly encode the plurality of electronic addresses.

20. The method of claim 16 wherein the code is read from the object at a first location, wherein the translation information is retrieved from a database at a second location, and wherein the translation information is communicated to the first location.

21. The method of claim 16 wherein the code is associated with one of the plurality of printed articles.

22. The method of claim 16 wherein the code includes an article-specific portion and a publication-specific portion, and wherein the portion of the code is absent of the article-specific portion.

23. The method of claim 16 wherein the plurality of electronic addresses includes an electronic address associated with the code, the electronic address comprising at least a portion of at least one of a Uniform Resource Locator, a Uniform Resource Name, an Internet Protocol Address, and an electronic mail address.

24. A system for navigating an electronic network, the system comprising:
- a data reader to read a first code and a second code from a printed publication having a first printed article and a second printed article, wherein the first code is associated with the first printed article and the second code is associated with the second printed article;
- a transmitter operatively associated with the data reader to communicate a portion of the first code to a remote database;
- a receiver to receive translation information from the remote database, the translation information associating a first electronic address with the first code and a second electronic address with the second code, wherein the first electronic address differs from the second electronic address;
- a local database operatively associated with the receiver to store the translation information received from the remote database; and
- a processor operatively associated with the data reader and the local database to translate the first code to the first electronic address and the second code to the second electronic address using the translation information;
- wherein the processor translates the second code to the second electronic address without accessing the remote database after the second code has been read by the data reader.

25. The system of claim 24 wherein the data reader comprises a bar code reader.

26. A system for providing electronic address translation information, the system comprising:
- a database; and
- a computer to receive a first portion of a code read from a printed publication having a plurality of printed articles and a plurality of codes for links associated with the printed articles, the computer operative to retrieve from the database translation information for the plurality of codes based upon the first portion of the code, the translation information associating a plurality of electronic addresses with the plurality of codes, the computer further operative to communicated the translation information for the plurality of codes.

* * * * *

UNITED STATES PATENT AND TRADEMARK OFFICE
CERTIFICATE OF CORRECTION

| | | |
|---|---|---|
| PATENT NO. | : 6,138,151 | Page 1 of 1 |
| APPLICATION NO. | : 08/938266 | |
| DATED | : October 24, 2000 | |
| INVENTOR(S) | : Reber et al. | |

It is certified that error appears in the above-identified patent and that said Letters Patent is hereby corrected as shown below:

ON TITLE PAGE:

Please Insert:

-- Related U.S. Application Data:

(63)  Continuation-in-part of application No. 08/710,820, filed Sep. 23, 1996, now U.S. Pat. No. 5,940,595; application No. 08/726,004, filed Oct. 4, 1996, now U.S. Pat. No. 5,995,105; application No. 08/732,956, filed Oct. 17, 1996, now U.S. Pat. No. 5,938,726; application No. 08/744,338, filed Nov. 7, 1996, now U.S. Pat. No. 5,986,651; application No. 08/858,184, filed May 28, 1997, now U.S. Pat. No. 5,930,767 and application No. 08/876,935, filed June 16, 1997, now U.S. Pat. No. 6,081,827. --

IN THE SPECIFICATION:

Col. 1, line 26, delete "08/876,934" and insert -- 08/876,935 --.

Signed and Sealed this

First Day of May, 2007

JON W. DUDAS
*Director of the United States Patent and Trademark Office*